United States Patent
Shyr et al.

(10) Patent No.: US 8,004,460 B2
(45) Date of Patent: *Aug. 23, 2011

(54) NOVAS HYBRID POSITIONING TECHNOLOGY USING TERRESTRIAL DIGITAL BROADCASTING SIGNAL (DBS) AND GLOBAL POSITIONING SYSTEM (GPS) SATELLITE SIGNAL

(75) Inventors: You-Yuh Jack Shyr, San Jose, CA (US); Mingqiang Cheng, Shengdu (CN); Cuichai Ji, Shengdu (CN)

(73) Assignee: O2Micro International, Ltd., Georgetown (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/726,887

(22) Filed: Mar. 18, 2010

(65) Prior Publication Data

US 2010/0171660 A1 Jul. 8, 2010

Related U.S. Application Data (63) Continuation of application No. 11/440,179, filed on May 24, 2006, now Pat. No. 7,701,388.

(60) Provisional application No. 60/736,725, filed on Nov. 15, 2005.

(51) Int. Cl.
*G01S 19/45* (2010.01)
(52) U.S. Cl. .................................. 342/357.28
(58) Field of Classification Search ... 342/357.2–357.78
See application file for complete search history.

(56) References Cited

U.S. PATENT DOCUMENTS

| | | | |
|---|---|---|---|
| 5,982,324 A | 11/1999 | Watters et al. | |
| 6,097,974 A * | 8/2000 | Camp et al. | 455/575.7 |
| 6,252,543 B1 | 6/2001 | Camp | |
| 7,701,388 B2 * | 4/2010 | Shyr et al. | 342/357.29 |
| 2002/0184653 A1 | 12/2002 | Pierce et al. | |
| 2002/0199196 A1 | 12/2002 | Rabinowitz et al. | |

(Continued)

FOREIGN PATENT DOCUMENTS

JP 10300485 A 11/1998

(Continued)

OTHER PUBLICATIONS

English language translation of JP office action received in Japan Application No. 2006-308326 dated Jan. 27, 2011.

*Primary Examiner* — Thomas H Tarcza
*Assistant Examiner* — Nga X Nguyen
(74) *Attorney, Agent, or Firm* — Wang Law Firm, Inc.; Li K. Wang (57) ABSTRACT

A positioning method using global positioning system (GPS) signal and digital broadcasting system (DBS) signal. The method includes detecting a presence status of the GPS signal through a signal detector in a receiver, detecting a presence status of the DBS signal through the signal detector, determining the signal strength of the GPS signal if the GPS signal is detected, determining the signal strength of the DBS signal if the DBS signal is detected, choosing one positioning mode among a plurality of positioning modes in a signal processing unit in the receiver based on signal presence status and the signal strength of a detected signal, and determining a location of the receiver based on the chosen positioning mode. The plurality of positioning modes includes standalone GPS mode, assisted GPS (AGPS) mode, assisted GPS positioning with DBS assist mode, DBS positioning with GPS assist mode, standalone DBS mode, and assist DBS mode.

20 Claims, 8 Drawing Sheets

U.S. PATENT DOCUMENTS

| | | |
|---|---|---|
| 2003/0145328 A1 | 7/2003 | Rabinowitz et al. |
| 2004/0140932 A1 | 7/2004 | Spilker |
| 2004/0189515 A1* | 9/2004 | Vannucci ................ 342/357.01 |
| 2005/0015162 A1 | 1/2005 | Omura et al. |

FOREIGN PATENT DOCUMENTS

| | | |
|---|---|---|
| JP | 11271076 A | 10/1999 |
| JP | 2004040171 A | 2/2004 |
| JP | 2004109139 A | 4/2004 |
| JP | 2004208274 A | 7/2004 |
| JP | 2004297135 A | 10/2004 |
| JP | 2004301838 A | 10/2004 |
| JP | 2005221331 A | 8/2005 |
| WO | 0190772 A1 | 11/2001 |
| WO | 02063866 A2 | 8/2002 |
| WO | 03021286 A2 | 3/2003 |
| WO | 03075630 A2 | 9/2003 |
| WO | 2004038450 A2 | 5/2004 |

\* cited by examiner

NOVAS HYBRID POSITIONING TECHNOLOGY USING TERRESTRIAL DIGITAL BROADCASTING SIGNAL (DBS) AND GLOBAL POSITIONING SYSTEM (GPS) SATELLITE SIGNAL

RELATED APPLICATION

This application is a continuation of and claims the benefit of U.S. application Ser. No. 11/440,179, filed on May 24, 2006, for NOVAS HYBRID POSITIONING TECHNOLOGY USING TERRESTRIAL DIGITAL BROADCASTING SIGNAL (DBS) AND GLOBAL POSITIONING SYSTEM (GPS) SATELLITE SIGNAL, which claims the benefit of U.S. Provisional Application No. 60/736,725, A NOVAS HYBRID POSITIONING TECHNOLOGY USING TERRESTRIAL DIGITAL BROADCASTING SIGNAL (DBS) AND GLOBAL POSITIONING SYSTEM (GPS) SATELLITE SIGNAL, filed on Nov. 15, 2005, the specification of which is hereby incorporated in its entirety by this reference.

FIELD OF THE INVENTION

The present invention relates to positioning technology and more particularly to positioning technology using terrestrial digital broadcasting signal (DBS) and global positioning system (GPS) satellite signal.

BACKGROUND OF THE INVENTION

Global positioning system (GPS) is currently the most widely used positioning system. Usually, the GPS satellites are located more than 20 kilometers above the surface of earth. GPS signal degrades significantly over such a long distance when it reaches the earth. Generally, a GPS receiver requires at least a sensibility of −130 dBm to acquire a GPS signal in a clear and open sky environment. In urban or indoor environment, the GPS receiver may require a sensitivity parameter ranging from −155 dBm to −160 dBm or more than −160 dBm to perform GPS positioning functions. Furthermore, the performance and accuracy of GPS positioning system will degrade dramatically due to any reflection, blockage and multi-path effect of GPS signals under urban or indoor environment.

With the digitalization of terrestrial analog audio broadcasting and analog video broadcasting technologies, which correspond to two mainstream standards, namely DAB (digital audio broadcasting) and DVB (digital video broadcasting)/ATSC (advanced television system committee) respectively, terrestrial digital broadcasting system (T-DBS), which includes DAB, DVB, and ATSC system, has an unparalleled edge over the global positioning system in terms of signal transmission power, signal transmission distance. Furthermore, the penetration ability of T-DBS signals is much stronger than that of GPS signal broadcasting at L1 carrier frequency level. Terrestrial digital broadcasting system can be used in environments such as basement, stairways and underground parking lots where GPS positioning fails to perform. In addition, the use of the terrestrial digital broadcasting system can serve as a complement to the GPS in an urban environment where GPS positioning results become unreliable due to the densely built high-rises. Thus, it is to a hybrid positioning technology using T-DBS signal and GPS signal that the present invention is primarily directed.

SUMMARY OF THE INVENTION

There is provided a receiver for determining position using terrestrial digital broadcasting signal (DBS) and global positioning system (GPS) satellite signal. The receiver includes a first tuner, a second tuner, a signal detector, a hybrid signal processing unit, a measurement data processing unit and an assist data processing unit. The first tuner is used to convert the GPS signal from its original frequency to an intermediate frequency (IF). The second tuner is used for converting the DBS signal to an intermediate frequency (IF). The signal detector is capable of detecting the existence of the GPS signal and the DBS signal, measuring the signal strength of the detected signal and outputting a signal indicating a positioning mode based on the measured signal strength. The hybrid signal processing unit is capable of choosing a positioning mode among a plurality of positioning modes and determining position of the transmitters and arrival time difference between each signal arriving at the receiver. The measurement data processing unit coupled to the hybrid signal processing unit for determining the position of the receiver based on the position of the transmitters and the arrival time difference. The assist data processing unit coupled to the hybrid signal processing unit is adapted to receive assistance data from an assist station and provide the assistance data to hybrid signal processing unit for further signal processing when an assist positioning mode is chosen. The plurality of positioning modes includes standalone GPS positioning mode, assisted GPS (AGPS) positioning mode, assisted GPS positioning with DBS assist mode, DBS positioning with GPS assist mode, standalone DBS positioning mode, and assist DBS positioning mode.

There is also provided a method for obtaining a position using global positioning system (GPS) signal and digital broadcasting system (DBS) signal. The method includes detecting the presence of a GPS signal in a signal detector in a receiver, detecting the presence of a DBS signal in the signal detector, determining the signal strength of the GPS signal if the GPS signal is detected, determining the signal strength of the DBS signal if the DBS signal is detected, providing a plurality of positioning modes, choosing one positioning mode among the plurality of positioning modes in a signal processing unit in the receiver based on signal presence status and the signal strength of the detected signal, and determining the location of the receiver based on the chosen positioning mode. The plurality of positioning modes includes standalone GPS positioning mode, assisted GPS (AGPS) positioning mode, assisted GPS positioning with DBS assist mode, DBS positioning with GPS assist mode, standalone DBS positioning mode, and assist DBS positioning mode.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
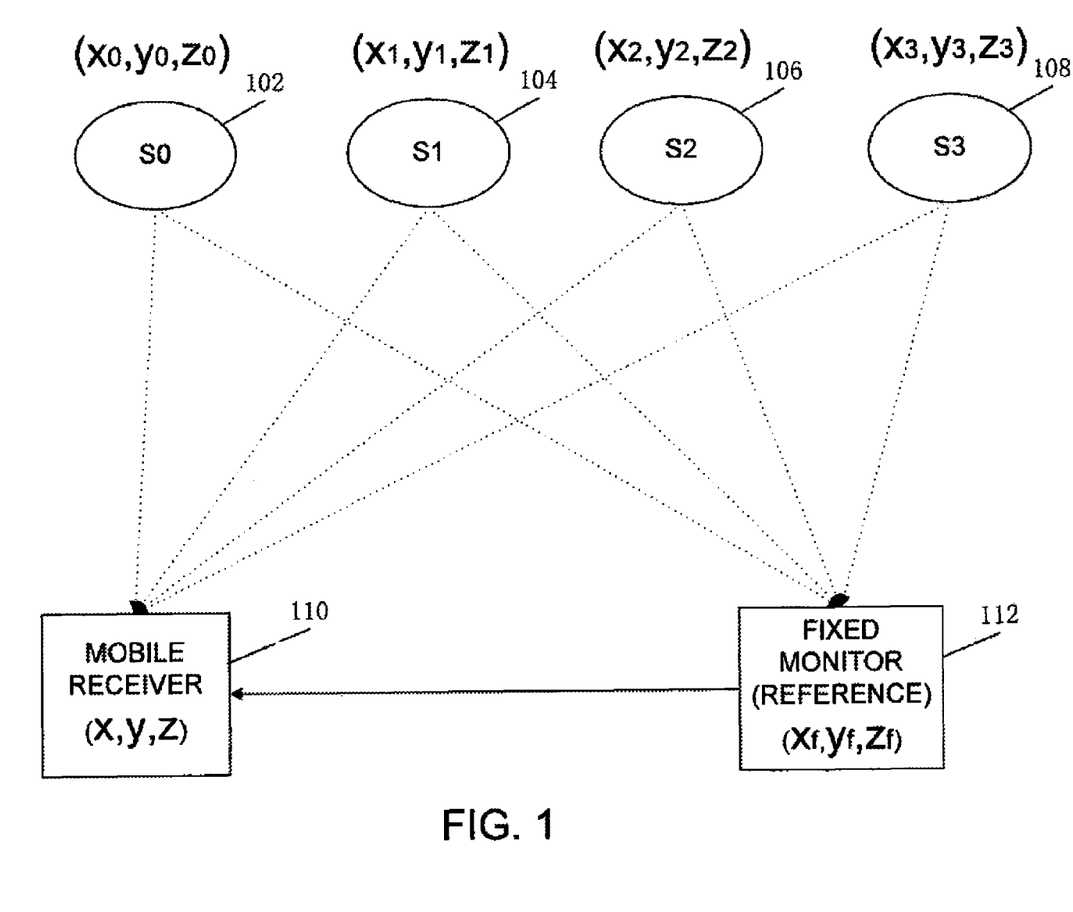
FIG. 1 is a simplified model of a positioning system.

FIG. 1 illustrates a simplified model of a positioning system. The position system includes a plurality of wireless transmission station (e.g. 102, 104, 106, 108)), a receiving station such as a mobile receiver 110 and an optional reference station 112 (also known as assist server, assist station, or fixed monitor). For a GPS system, in order to calculate the user position, a receiver generally needs positional information from at least four different transmission stations. For simplicity, FIG. 1 illustrates four transmission stations S0 102, S1 104, S2 106 and S3 108 containing corresponding location information (x0, y0, z0), (x1, y1, z1), (x2, y2, z2), and (x3, y3, z3). Coordinates of the four transmission stations, mobile receiver and the reference station are shown in FIG. 1. According to the spatial coordinate formula, the following equation group (1) can be obtained:

$$\begin{cases} \sqrt{(x_0-x)^2+(y_0-y)^2+(z_0-z)^2} = c \times (\tau_{cd0}) \\ \sqrt{(x_1-x)^2+(y_1-y)^2+(z_1-z)^2} = c \times (\tau_{cd1}) \\ \sqrt{(x_2-x)^2+(y_2-y)^2+(z_2-z)^2} = c \times (\tau_{cd2}) \\ \sqrt{(x_3-x)^2+(y_3-y)^2+(z_3-z)^2} = c \times (\tau_{cd3}), \end{cases} \quad (1)$$

where $\tau_{cdl}$ is defined as the transmission time of a wireless signal (e.g. GPS signal or T-DBS signal) transmitted from a transmission station to a receiver.

Suppose that $t_{jm}$ (m∈[0,3]) refers to the moment when the wireless signal is transmitted, and $t_{in}$ (n∈[0,3]) refers to the moment when the wireless signal reaches the receiver, then the following equation group (2) can be obtained:

$$\text{RECEIVER} \quad (2)$$

$$\begin{cases} \sqrt{(x_0-x)^2+(y_0-y)^2+(z_0-z)^2} = c \times (t_{j0}-t_{i0}) \\ \sqrt{(x_1-x)^2+(y_1-y)^2+(z_1-z)^2} = c \times (t_{j1}-t_{i1}) \\ \sqrt{(x_2-x)^2+(y_2-y)^2+(z_2-z)^2} = c \times (t_{j2}-t_{i2}) \\ \sqrt{(x_3-x)^2+(y_3-y)^2+(z_3-z)^2} = c \times (t_{j3}-t_{i3}) \end{cases}$$

AND $$\begin{cases} c \times (t_{j0}-t_{i0}) = c \times (t_{j0}+0-t_{i0}) = c \times (t_{j0}+0-(t_{i0}+0)) \\ c \times (\tau_{j1}-t_{i1}) = c \times (t_{j0}+\Delta T_1-t_{i1}) = c \times (t_{j0}+\Delta T_1-(t_{i0}+\Delta T_{x1})) \\ c \times (\tau_{j2}-t_{i2}) = c \times (t_{j0}+\Delta T_2-t_{i2}) = c \times (t_{j0}+\Delta T_2-(t_{i0}+\Delta T_{x2})) \\ c \times (\tau_{j3}-t_{i3}) = c \times (t_{j0}+\Delta T_3-t_{i3}) = c \times (t_{j0}+\Delta T_3-(t_{i0}+\Delta T_{x3})) \end{cases}$$

THEN $$\begin{cases} \sqrt{(x_0-x)^2+(y_0-y)^2+(z_0-z)^2} = c \times (t_{j0}+0-(t_{i0}+0)) \\ \sqrt{(x_1-x)^2+(y_1-y)^2+(z_1-z)^2} = c \times (t_{j0}+\Delta T_1-(t_{i0}+\Delta T_{x1})) \\ \sqrt{(x_2-x)^2+(y_2-y)^2+(z_2-z)^2} = c \times (t_{j0}+\Delta T_2-(t_{i0}+\Delta T_{x2})) \\ \sqrt{(x_3-x)^2+(y_3-y)^2+(z_3-z)^2} = c \times (t_{j0}+\Delta T_3-(t_{i0}+\Delta T_{x3})), \end{cases}$$

where is the transmission time for a wireless signal traveling from a designated transmission station (S0) to the receiver. $\Delta T_i$ is the transmission time difference between transmission station i and the designated reference transmission station; and 3) $\Delta T_{xi}$ is the difference between the time when the signal transmitted from the transmission station i reaches the receiver and the time when the signal transmitted from the designated reference transmission station reaches the receiver. Let $M=t_{j0}-t_{i0}$, equation group (3) can be obtained based on equation group (2):

$$\text{RECEIVER} \quad (3)$$

$$\begin{cases} \sqrt{(x_0-x)^2+(y_0-y)^2+(z_0-z)^2} = c \times (M) \\ \sqrt{(x_1-x)^2+(y_1-y)^2+(z_1-z)^2} = c \times (M+\Delta T_1-\Delta T_{x1}) \\ \sqrt{(x_2-x)^2+(y_2-y)^2+(z_2-z)^2} = c \times (M+\Delta T_2-\Delta T_{x2}) \\ \sqrt{(x_3-x)^2+(y_3-y)^2+(z_3-z)^2} = c \times (M+\Delta T_3-\Delta T_{x3}) \end{cases}$$

As illustrated in equation group (3), if (x0, y0, z0), (x1, y1, z1), (x2, y2, z2), (x3, y3, z3), $\Delta T_i$, and $\Delta T_{xi}$ are known, (x, y, z) and M can be determined, thereby, the user position can be calculated. In other words, for a positioning system (GPS or T-DBS), if the difference in time of transmitting the wireless signal ($\Delta T_i$) and the differences in time of receiving the wireless signals ($\Delta T_{xi}$) are known, and the positions of each transmission stations are also known according to the received signals or local data base, the absolute location of the receiver can be determined.

For the GPS system, usually, all GPS signals transmit at almost the same time (all satellites transmit the same frame of signals simultaneously, while in fact, the transmission time may differ slightly with one another, but the receiver can correct the differences according to satellite ephemeris), that is, $\Delta T_i \approx 0$ (i∈[0,3]). Therefore, in reality, the three-dimension positioning can be performed simply based on the differences in time of receipts of GPS signals at the receiver and the received navigation data contained in the GPS signal according to the equation group (3).

For terrestrial digital broadcasting system, if a single frequency network (SFN) is set up, and if the network side can ensure all transmission towers to transmit the same frame of signals simultaneously (transmission towers may be synchronized using GPS time), then the user position may be determined after receiving signals transmitted by the transmission towers according to the same positioning principle of the GPS system as shown in the equation group (3). If the network side fails to transmit signals simultaneously, or there is a difference in the time for transmitting the signals from each transmission station, the difference will lead to an error in positioning. If a high positioning accuracy is desired, a reference station (also known as a fixed monitor) may be required to provide information for calculating $\Delta T_i$ (i∈[0,3]) as illustrated in FIG. 1. $\Delta T_i$ can be calculated according to the equation group (4) shown below:

REFERENCE (4)

$$\begin{cases} \sqrt{(x_0 - x_f)^2 + (y_0 - y_f)^2 + (z_0 - z_f)^2} = \\ c \times (t_{if0} - t_{i0}) = c \times \left( \dfrac{t_{if0} -}{(t_{i0} + 0)} \right) \\ \sqrt{(x_1 - x_f)^2 + (y_1 - y_f)^2 + (z_1 - z_f)^2} = \\ c \times (\tau_{if1} - t_{i1}) = c \times \left( \dfrac{t_{if0} + \Delta T_1 -}{(t_{i0} + \Delta T_{x1})} \right) \\ \sqrt{(x_2 - x_f)^2 + (y_2 - y_f)^2 + (z_2 - z_f)^2} = \\ c \times (\tau_{if2} - t_{i2}) = c \times \left( \dfrac{t_{if0} + \Delta T_2 -}{(t_{i0} + \Delta T_{x2})} \right) \\ \sqrt{(x_3 - x_f)^2 + (y_3 - y_f)^2 + (z_3 - z_f)^2} = \\ c \times (\tau_{if3} - t_{i3}) = c \times \left( \dfrac{t_{if0} + \Delta T_3 -}{(t_{i0} + \Delta T_{x3})} \right) \end{cases}$$

where ($x_f$, $y_f$, $z_f$) is the location information of the reference station. The four unknowns $t_{if0}$, $\Delta T_1$, $\Delta T_2$, $\Delta T_3$ can be calculated from equation group (4). After $\Delta T_i$ is calculated, the equation group (3) can be solved and the user position can be obtained.

Figure 2:
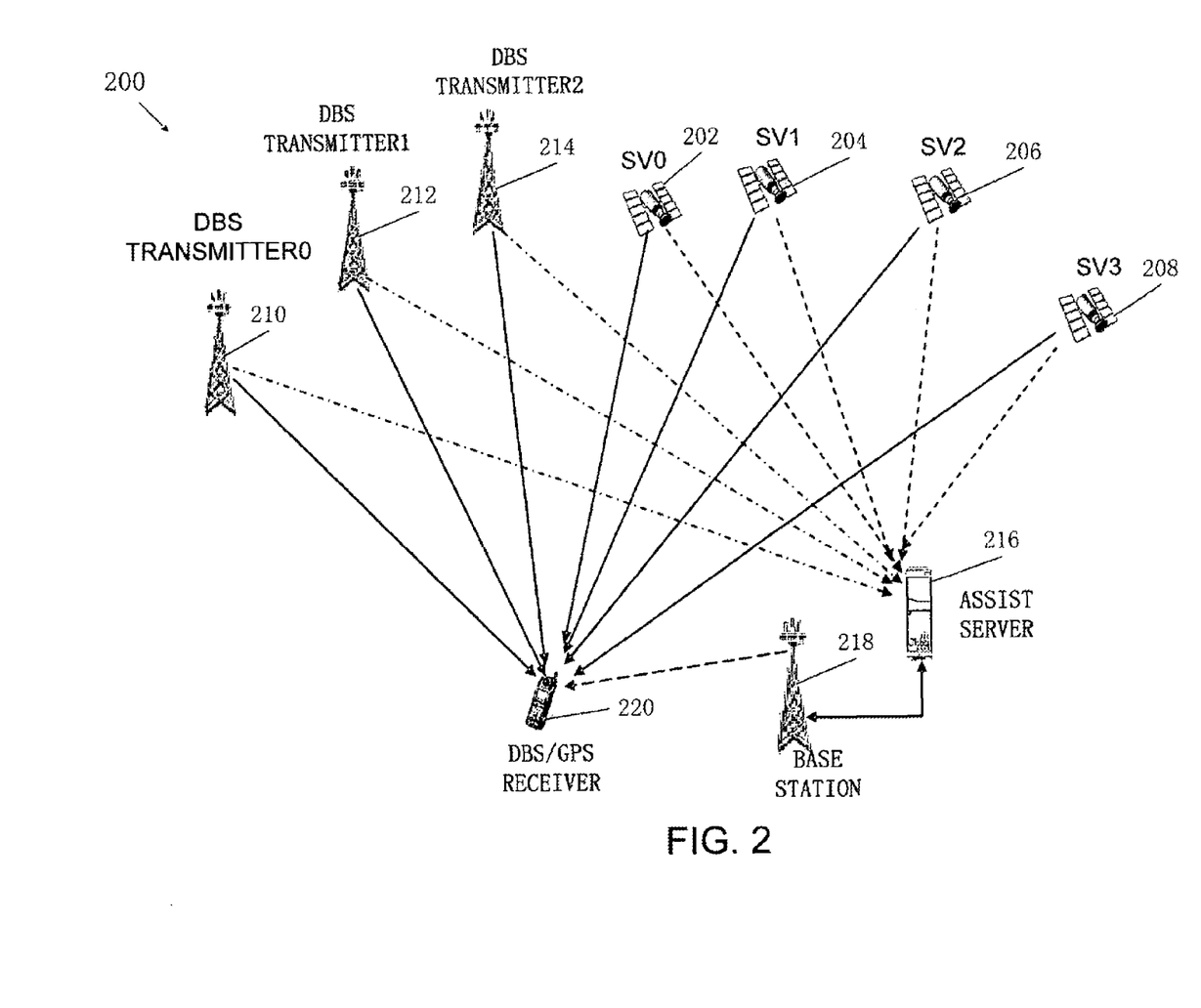
FIG. 2 is a schematic diagram of a hybrid positioning system using GPS and/or DBS signal according to one embodiment of the present invention.

FIG. 2 illustrates a schematic diagram of a hybrid positioning system 200 using GPS signal and/or DBS signal according to one embodiment of the present invention. The hybrid positioning system includes a plurality of GPS satellite (SV0 202, SV1 204, SV2 206, SV3 208), a plurality of DBS transmitters (210, 212, 214), a GPS/DBS receiver 220, an assist server 216, and a base station 218. The plurality of GPS satellites are used to transmit GPS signals which include navigation data. The assist server 216 is located in a clear outdoor environment. Therefore, the signal strength of the GPS signal received by the assist server 216 is generally stronger than that of the signal directly received by the receiver. Based on the stronger GPS signals, the assist server 216 is capable of measuring a Doppler shift of each GPS satellite and Doppler shift rate of each GPS satellite from the received GPS signals. Then, this measured information is transmitted from the assist server 216 to the base station 218. The base station 218 is capable of providing GPS assistance data to the receiver 220 for a better performance of the receiver. The receiver 220 receives the GPS signals along with the GPS assistance data and determines the user location. Furthermore, the assist server 216 is further capable of receiving the DBS signals transmitted from the DBS transmitter 0 210, the DBS transmitter 1 212, the DBS transmitter 2 214. The DBS signals include DBS data indicating the coordinates of each DBS transmitter. Based on the coordinates of the DBS transmitter 210, 212, 214 and the coordinates of the assist server 216, the transmission time difference ($\Delta T_i$) can be calculated according to equation group (4). The receiver 220 receives the DBS signals transmitted from each DBS transmitter and the assistant data from the assist server 216. It is understood by those skilled in the art that, for the GPS system, the user position can be determined via the GPS signals transmitted from at least four GPS satellites, while, for the DBS positioning system, the user location can be determined via the DBS signals from at least three DBS transmitters. It should be noted that the number of GPS satellites and the DBS transmitters are not limited to the number shown in FIG. 2. A modification of the number of the GPS satellites and DBS transmitters can be conceived according to different embodiment of the present invention without departing from the spirit of the present invention.

The DBS/GPS receiver 220 can choose to receive signals from DBS transmitters or GPS satellites according to application environments. Assistance data is used when the receiver operates in assisted mode. The present invention provides a plurality of positioning modes. The receiver 220 is able to switch between different positioning modes depending on the received signal strength or working environments. The plurality of positioning modes include standalone GPS positioning mode, assisted GPS (AGPS) positioning mode, assisted GPS positioning with DBS assist mode, DBS positioning with GPS assist mode, standalone DBS positioning mode, and assist DBS positioning mode. The following description will explain each mode in detail.

Standalone GPS Positioning Mode

Standalone GPS positioning mode is directed to conventional applications under open sky and outdoor environment. The receiver requires the GPS signals transmitted from at least 4 satellites. The receiver extracts the coordinate information from the four GPS signals and determines the time difference for receiving the four GPS signals as understood by those skilled in the art. Thus, the user position can be calculated based on the formula given by equation group (3).

Assisted GPS (AGPS) Positioning Mode

In this mode, the receiver receives and uses the GPS signals and the GPS assistance data from the assist station (i.e. assist server 216 in FIG. 2). The AGPS positioning mode utilizes assistance data from the assist station 216 to assist the positioning in terms of acquiring and tracking stage. The GPS assistance data include Doppler shift, Doppler shift rate and navigation data. Assisted by the GPS assistance data, the receiver may perform coherent integration in a long time period and obtain a higher gain of the spread spectrum signal. However, the use of the assistance data requires an accurate GPS time. Therefore, the receiver working in AGPS mode must undertake a critical step: clock synchronization. That is, the local time of the receiver must be synchronized with the GPS time before the utilizing the assistance data. One approach to realize time synchronization is to use a large quantity of parallel correlators to conduct correlation based on a certain GPS signal. When the certain GPS signal is acquired, the receiver then starts to search and acquire more GPS signals from other GPS satellites. The method is severely affected by unfavorable network delay that may occur during the transmission of the assistance GPS data. A long network delay may result in a huge amount of computation task. In addition, when the network delay period is unknown, the time synchronization method may also take a lot of time. Therefore, to achieve a higher efficiency, AGPS mode requires a short network delay period and a large amount of parallel correlators.

Assisted GPS Positioning with DBS Assist Mode

According to one embodiment of the present invention, DBS signal may be used to assist AGPS positioning by dramatically reducing the time spent on clock synchronization and thereby enhancing the performance of AGPS. For example, when the DBS signal is a DVB signal or DAB signal, synchronization time stamp (STS) information comprised in the DVB or DAB signal can be extracted from each frame. If the measurement unit of the STS is 100 ns, it helps to determine the time when a next mega-frame is transmitted. Since the transmission distance from the DBS transmission station to the receiver is generally no longer than 75 Km, the transmission delay is less than 75 Km/300,000 Km=0.25 ms. The duration can be advantageously used to realize time synchronization in AGPS mode and consequently realize accurate and fast positioning under indoor environment. Assisted GPS positioning with DBS assist has outstanding advantages over traditional AGPS in terms of TTFF (Time-To-First-Fix) performance, especially under conditions when the number of DVB/DAB transmitters are limited.

DBS Positioning with GPS Assist Mode

This positioning mode is desirable in the situation when both the number of DBS transmitters and the number of visible GPS satellites are limited, for instance, 2 DBS transmitters and 3 visible GPS satellites. In this case, the receiver 216 receives both DBS signals and GPS signals. Therefore, this positioning mode is also referred to as a mixed positioning mode. It should be noted that the total number of the transmission stations (including DBS transmitters and GPS satellites) should be at least five stations. The reason for using at least five stations is that the mixed employment of the two positioning systems may introduce a new unknown factor (the transmission time difference between the two systems). Originally, in equation group (3), the location information from the 4 transmission stations may help to calculate the four unknowns x, y, z and M. However, with the introduction of the new unknown factor, one more equation is needed to calculate the additional unknown factor. Therefore, there should be at least five transmission stations to provide the coordinate information and the equation group (3) should be amended accordingly. The user position can be determined by analyzing the GPS signals and DVB/DAB signal information in a composite way.

Standalone DBS Positioning Mode

In the environments such as underground parking lots and tunnels where GPS satellites are invisible, only standalone DBS positioning mode is effective. The standalone DBS positioning mode requires signals from at least three DVB/DAB transmitters to conduct 2-Dimensional positioning. In this mode, no reference station is needed.

Assist DBS Positioning Mode

To improve the positioning accuracy, DBS assist station can be adopted to provide precise clock information. Fox example, the assist station receives the same DVB/DAB signal and calculates the transmission time difference $\Delta T_i$ based on coordinates of transmitter and assist station. The receiver is able to obtain the reception time difference (arrival time difference) $\Delta T_{xi}$ and calculate the user information according to the equation group (3).

Figure 3:
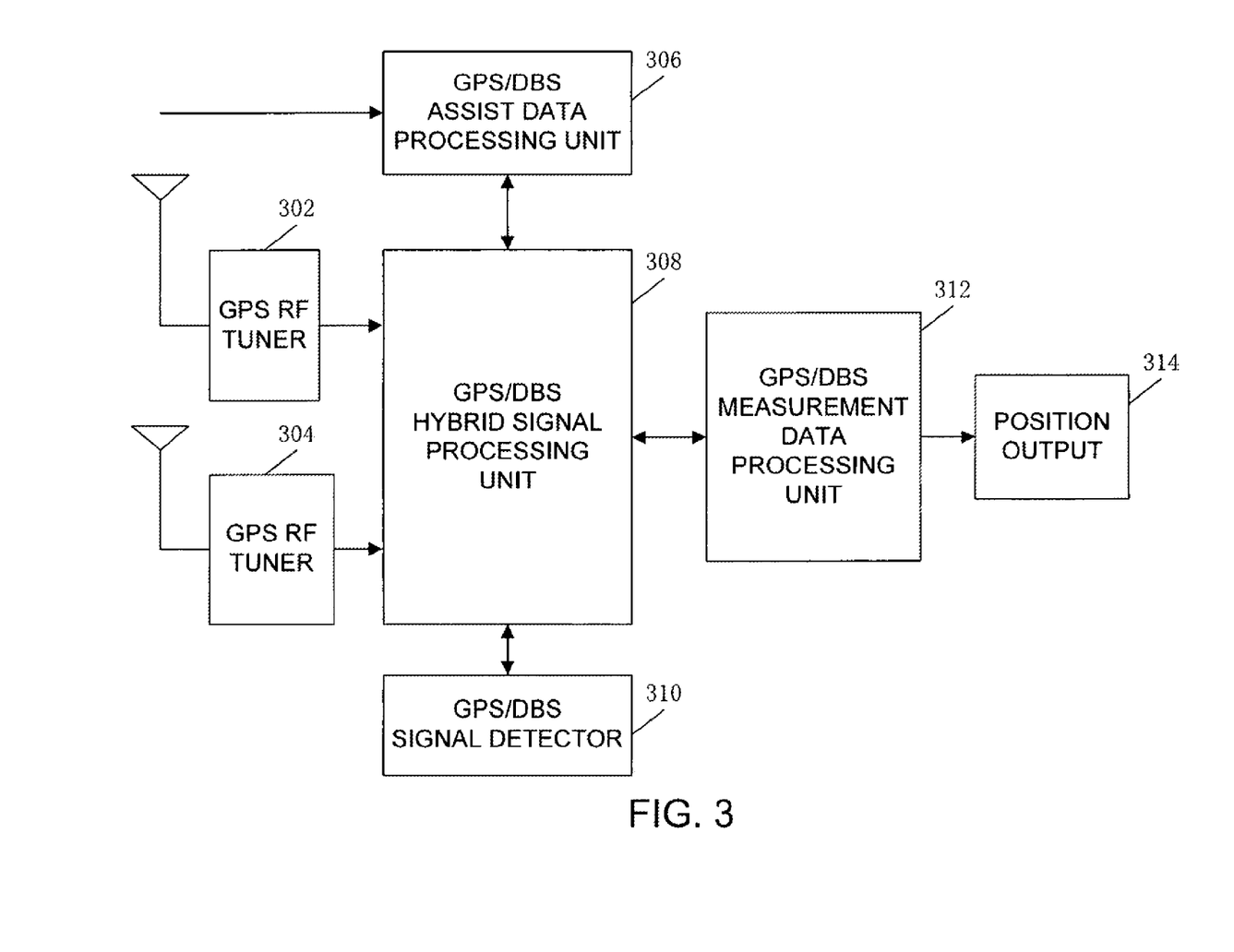
FIG. 3 is a block diagram of an exemplary GPS/DBS receiver according to one embodiment of the present invention.

FIG. 3 illustrates a block diagram of an exemplary GPS/DBS receiver according to one embodiment of the present invention. It should be noted that the receiver is consistent with the GPS/DBS receiver 216 illustrated in FIG. 2. The receiver includes a GPS RF tuner 302, a DBS RF tuner 304, a GPS/DBS assist data processing unit 306, a GPS/DBS hybrid signal processing unit 308, a GPS/DBS signal detector 310, a GPS/DBS measurement data processing unit 312 and a position output unit 314.

The GPS RF tuner 302 is used to receive GPS signals, convert these signals to GPS intermediate frequency (IF) signals, and send the IF signals to a base band processing unit 303. The DBS RF tuner 304 is used to receive DBS signals and convert these signals to DBS intermediate frequency (IF) signals.

The GPS/DBS hybrid signal processing unit 308 is used to perform acquisition, tracking, and demodulation of the GPS IF signal and/or DBS IF signal and to extract the navigation data or DBS data that indicate the locating information of the corresponding transmitter. The GPS/DBS hybrid signal processing unit 308 is further capable of measuring the time difference in receiving the GPS/DBS signal ($\Delta T_{xi}$) (or time stamp). The GPS/DBS hybrid signal processing unit 308 outputs $\Delta T_{xi}$, and navigation data and/or DBS data corresponding to (x0, y0, z0), (x1, y1, z1), (x2, y2, z2), (x3, y3, z3) in equation group (3). The GPS/DBS measurement data processing unit 312 is used to solve the equation group (3) and output the user coordinates, velocity, time and other user concerned information. The GPS/DBS signal detector 310 may detect the signal-to-noise ratio (SNR) of received GPS and/or DBS signal. The SNR information is sent to GPS/DBS hybrid signal processing unit 308 and is used to determine the positioning mode as previously detailed. Based on the SNR information, the GPS/DBS hybrid signal processing unit 308 is configured to operate in GPS signal processing mode (standalone GPS mode, AGPS mode), DBS signal processing mode (standalone DBS mode, assist DBS mode), or hybrid processing mode (assisted GPS positioning with DBS assist mode, DBS positioning with GPS assist mode). Usually, each positioning mode is assigned a priority. Standalone GPS positioning mode, assisted GPS (AGPS) positioning mode generally have a higher priority.

The GPS/DBS assist data processing unit 306 may process the GPS signal and DBS signal simultaneously or process one of the two types of signals. In operation, the GPS/DBS signal detector 310 is able to detect which type of signal is stronger and choose the corresponding positioning mode based on the detected outcome. If no DBS signal is detected, for example, in suburban environment, the receiver will switch to the GPS signal processing mode. If the detected GPS signal is very weak, for example, in the downtown area where high-rises are densely built, the receiver will switch to the DBS signal processing mode. Both these two modes are able to receive the assistance data from assist station to enhance the positioning performance. It should be noted that, in one embodiment, the GPS/DBS hybrid signal processing unit 308 may internally include two hardware modules to process GPS IF signal and DBS IF signal independently. The GPS/DBS assist data processing unit 306 is enabled when assist modes are entered. The GPS/DBS assist data processing unit 306 receives GPS assistance data and/or DBS assistance data and outputs the processed assistance data to the GPS/DBS hybrid signal processing unit 308. The position output unit 314 outputs standardized positioning results according to outputs from the previous stage 312.

Figure 4:
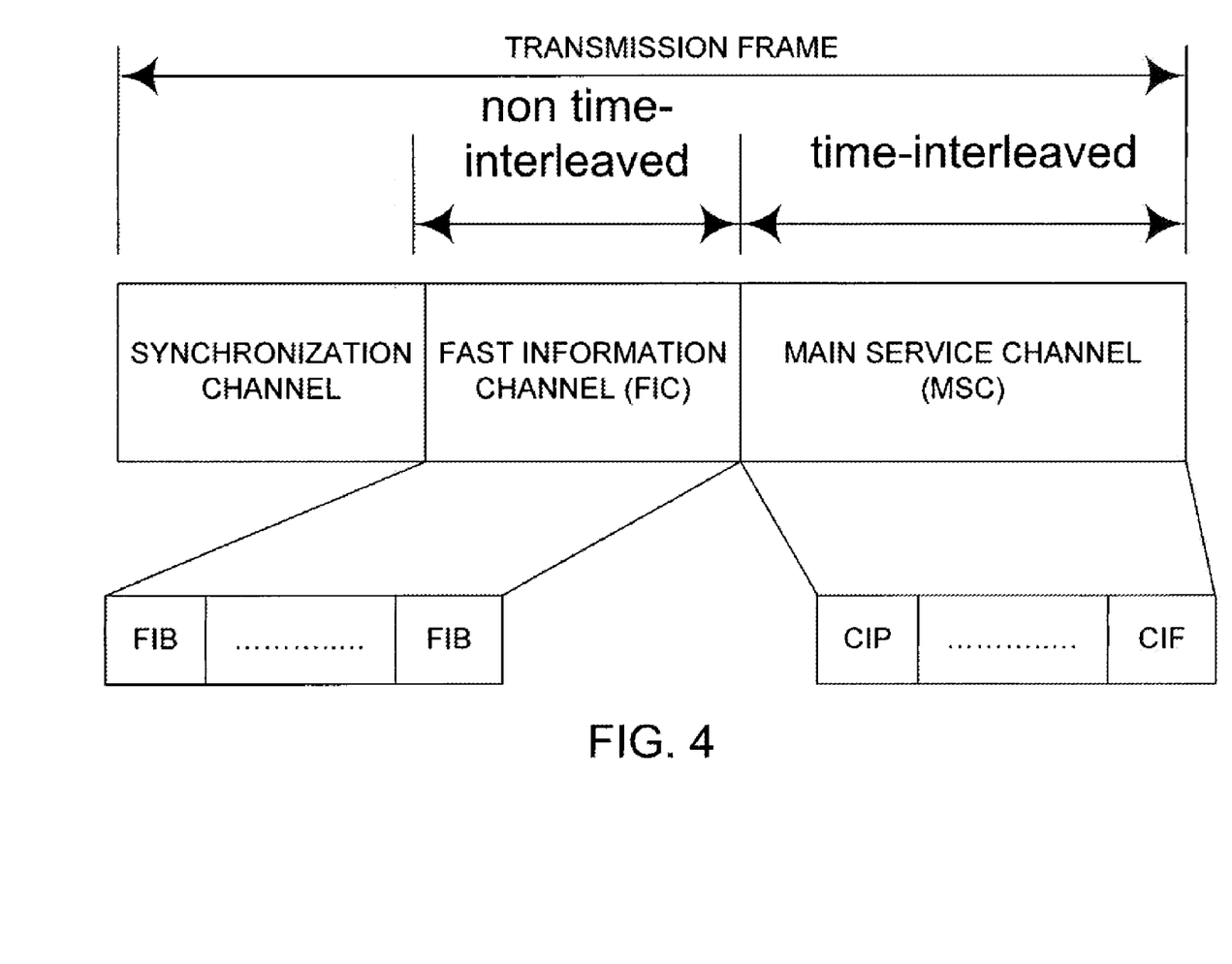
FIG. 4 is a transmission frame of a DAB signal according to one exemplary embodiment of the invention.

The following descriptions of FIG. 4 through FIG. 7 are mainly focused on how to use T-DBS signal for positioning purpose. FIG. 4 illustrates a transmission frame of a DAB signal. A DAB-T (terrestrial digital audio broadcasting) signal is modulated using COFDM (Coded Orthogonal Frequency Division Multiplexing) approach. In the mode-I (one of the DAB transmission frame structures), the content of a broadcasting program is transmitted by 1536 carriers with 1.536M bandwidth. The audio data is encoded complying with the MPEG-II standard. FIG. 4 illustrates the frame structure of a DAB-T signal in Mode-1. Data included in the frame comes from three sources: synchronization channel, fast information channel (FIC) and main service channel (MIC).

Figure 5:
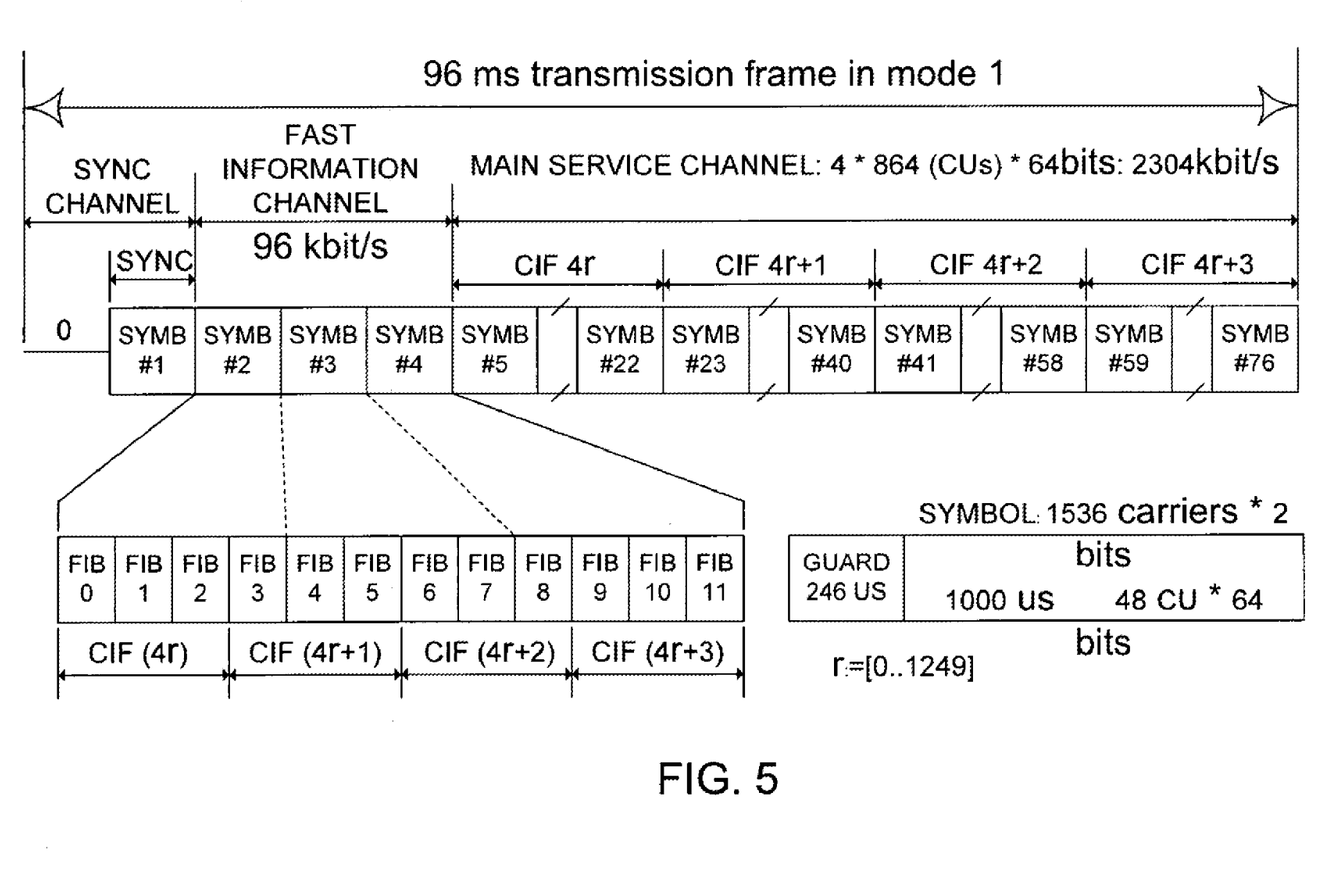
FIG. 5 is a detailed format of a transmission frame of a DAB signal in Mode-I according to one exemplary embodiment of the invention.

FIG. 5 illustrates a detailed structure of a transmission frame of a DAB signal in Mode-I. No matter in which DAB mode, information from synchronization channel occupies the first two OFDM (Orthogonal Frequency Division Multiplexing) symbols. The number of OFDM symbols required by the data from fast information channel and main service channel is related to transmission mode. For example, in Mode-I, information from fast information channel occupies three OFDM symbols, and information from main service channel occupies 72 OFDM symbols. The detailed frame structure is illustrated in FIG. 5. In Mode-I, each transmission frame is made up of 76 OFDM symbols and has a period of 96 ms.

The DAB signal includes two parts: main signal s(t) and optional signal $s_{TII}(t)$ (TII refers to Transmitter identifier information). The DAB signal is the sum of s(t) and $s_{TII}(t)$. In fact, during the transmission time of the first OFDM symbol, $s_{TII}(t)$ is transmitted, that is, the first OFDM symbol carries $s_{TII}(t)$ information.

After the DAB signal is received, OFDM (Orthogonal Frequency Division Multiplexing) demodulation is performed. After the frame synchronization, information from synchronization channel from the transmitter can be obtained, that is, the TII information can be extracted. After channel decoding, information from fast information channel from the transmitter can be obtained.

The positioning principle using DAB signal can be illustrated as below:
1. obtain TII signal. The way to obtain TII signal is described above.
2. obtain Main Identifier and Sub Identifier of transmitter. The Main Identifier and Sub Identifier correspond to the identification number of the transmitters. A carrier pair utilized by transmitter site can be determined from the received TII signal. The carrier pair corresponds to parameters P and C respectively where P equals the value of main identifier and C equals the value of sub identifier.
3. obtain FIG 0/22 (Fast information group). FIG 0/22 includes the position information of the transmitters. The fast information channel is divided into a plurality of fast information block (FIB), where the fast information block is divided into a plurality of fast information group (FIG). The FIG 0/22 can be obtained by filtering the FIB. When the conditions FIG type==(000) and FIG Extension==(10110) are met at the same time, FIG 0/22 can be filtered out;
4. obtain precise position $(x_i, y_i, z_i)$ of transmitters. The precise position information of the transmitters that the Main Identifier and Sub Identifier corresponding to can be obtained from FIG 0/22.
5. determine $\Delta T_{xi}$. Since each transmitter has a unique position, the value of the main identifier and the value of sub identifier are also unique. Consequently, the corresponding carrier pair in TII signal is also unique. The time difference in receiving the DAB signal ($\Delta T_{xi}$) can be obtained through correlation of carrier pair with locally generated carrier signals.
6. calculate user position. Since $(x_i, y_i, z_i)$ and $\Delta T_{xi}$ is obtained, the user position can be calculated according to the formula given by equation group (3).

, where step 1 though 5 are performed in the GPS/DBS hybrid signal processing unit 308 in FIG. 3 and step 6 is performed in GPS/DBS measurement data processing unit 312 in FIG. 3

Figure 6:
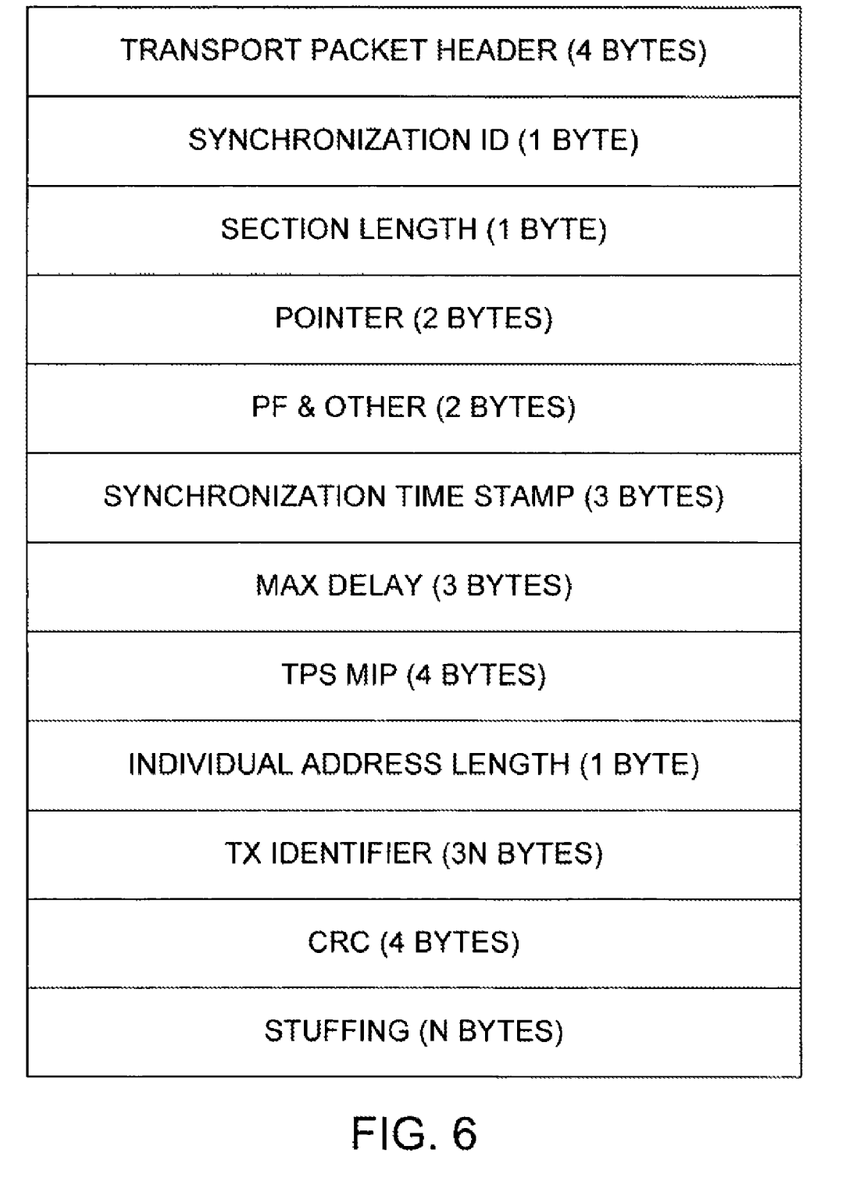
FIG. 6 is a mega-frame initialization packet in a mega frame of a DVB signal according to one exemplary embodiment of the invention.

FIG. 6 illustrates a mega-frame initialization packet (MIP) in a mega frame of a DVB signal. A DVB-T (terrestrial digital video broadcasting) signal is modulated using COFDM (Coded Orthogonal Frequency Division Multiplexing) approach. In 2K mode (2048 orthogonal carrier waves), data can be transmitted by 1512 carriers with optional 6M, 7M and 8M bandwidth. Furthermore, DVB-T may also provide support for 8K mode (8192 orthogonal carrier waves). There is also a standard DVB-H similar to DVB-T, which support portable signal reception. DVB-H supports 4K mode. Bother DVB-H and DVB-T are based on terrestrial DVB system. For a terrestrial DVB SFN network, mega-frame initialization packet (MIP) is inserted into TS stream in SFN adapter. The MIP indicates the start of the transmission of the first packet in a mega-frame (Synchronization Time Stamp, STS). The MIP format is shown in FIG. 6.

The format comprises a plurality of segments including transport packet header, synchronization ID, pointer, periodic flag, synchronization time stamp, Tx identifier, etc. MIP can be filtered out based on packet header, whose characteristic word is 0x15. Synchronization ID is used to indicate the existence of SFN network, whose characteristic word is 0x00. Two-word pointer indicates the number of TS packets between two MIP. Periodic flag (PF) indicates whether MIP message is transmitted periodically or not. Synchronization time stamp (STS) indicates the difference between the time when a next Mega-frame is output from single frequency network adapter and the standard GPS time. Tx identifier indicates which transmitter the received signal is from.

The positioning principle using DVB signal can be illustrated as below:
1. receive an OFDM signal, filter out MIP message based on packet header after synchronization and channel decoding;
2. determine whether the assistant information from the reference station is needed according to the value of synchronization ID. If SFN network is indicated, synchronization time stamp represents the value of $\Delta T_i$ (i∈[1,3]) in the positioning equation group (3); otherwise, the assistant information from reference station is needed to obtain $\Delta T_i$;
3. determine the identification number of each transmission tower according to Tx identifier. By looking up the database, the geographical coordinates of the transmission tower [$(x_0, y_0, z_0)$, $(x_1, y_1, z_1)$, $(x_2, y_2, z_2)$, $(x_3, y_3, z_3)$] can be obtained.
4. obtain the reception time difference ($\Delta T_{xi}$(i∈[1,3])) in receiving multi-path DVB wireless signals.

Figure 7:
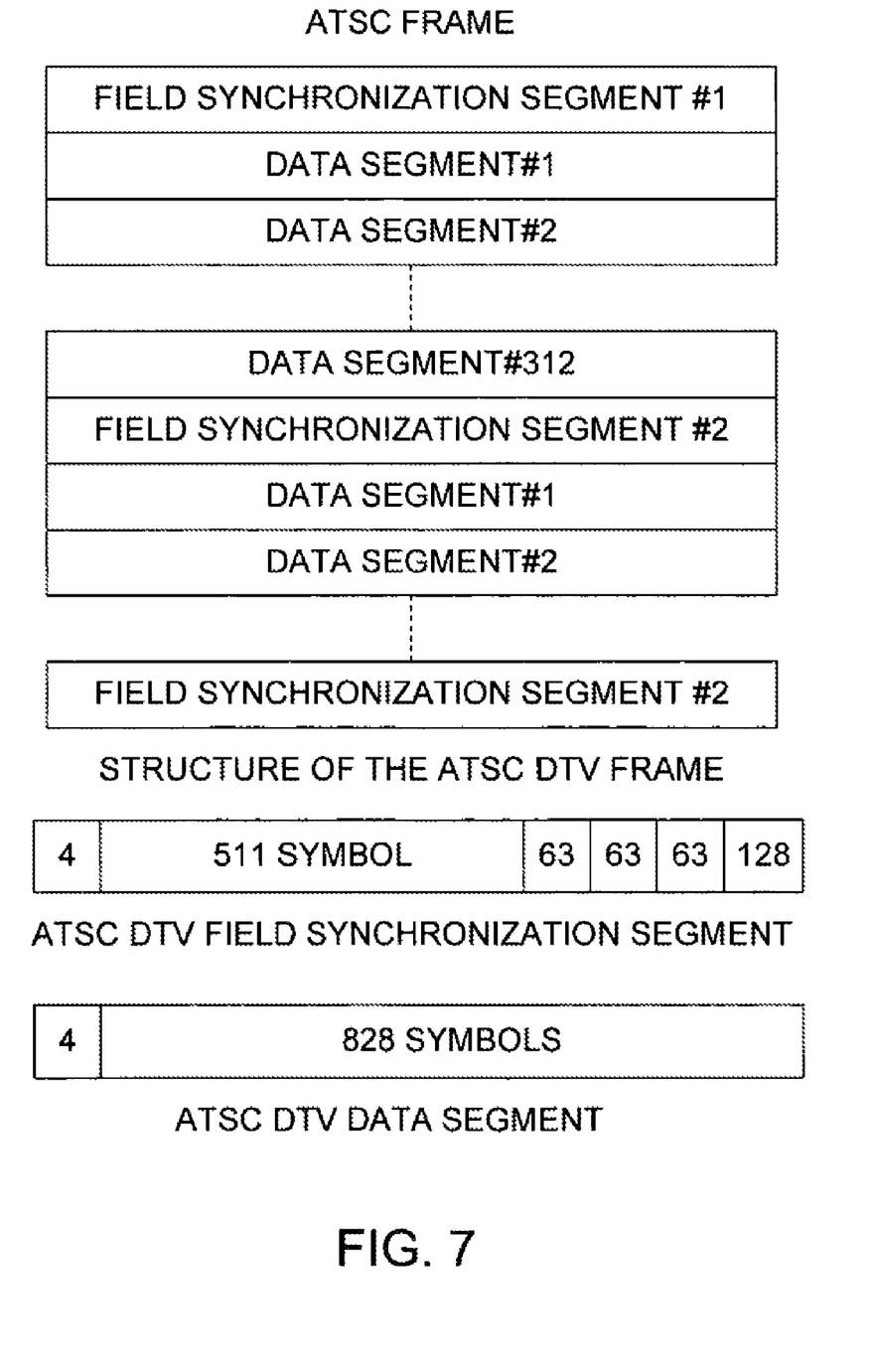
FIG. 7 is a frame of an ATSV signal according to one exemplary embodiment of the invention.

FIG. 7 illustrates a frame of an ATSC signal. An ATSC signal is modulated following vestigial side band modulation rule with 8 side bands (ATSC 8-VSB), and the symbol rate is 10.762237. ATSC signal is transmitted in the format of a frame. The frame structure is illustrated in FIG. 7. Each ATSC frame is made up of 624 segments which include field synchronization segments and data segments. Each segment includes 832 symbols. Both types of segments have the same four symbols of segment synchronization header, (−1,1,1,−1). According to the ATSC standard, segment synchronization header has a period of 77.3 us. ATSC positioning principle utilizes the segment synchronization header to realize positioning. During the establishment of SFN network, in order to ascertain the source of the received signal and measure the received signal, an RF watermark signal is asserted in ATSC signal for that purpose. When ATSC 8-VSB carries RF watermark signal, the watermark signal has two functions. One is to determine the source of the received signal. The other is to measure various characteristics of the received signal. The watermark signal adopts Kasami sequence. In fact, the Kasami sequence uses three-layer PN code. ATSC positioning principle makes use of this Kasami sequence and the field segment segments to realize positioning.

The positioning principle using ATSC signal can be illustrated as below:

1. Receive ATSC 8-VSB, demodulate the ATSC 8-VSB signal, perform Analog-to-digital conversion, perform correlation to extract Kasami sequence;
2. compare the information in Kasami sequence with the information from data base of the transmitters, and obtain the geographical coordinates of the transmitter;
3. Since the SFN network ensure all transmitters to transmit signals simultaneously, the transmission time difference is zero (i.e. $\Delta T_i=0$);
4. Since the information contained in field synchronization segment from each frame is known to the receiver side, the reception time difference ($\Delta T_{xi}$) can be obtained by performing correlation upon the field synchronization segment;
5. Since $x_i$, $y_i$, $z_i$, $\Delta T_i$, and $\Delta T_{xi}$ are known, the receiver position can be calculated based on the formula given by equation group (3).

Figure 8:
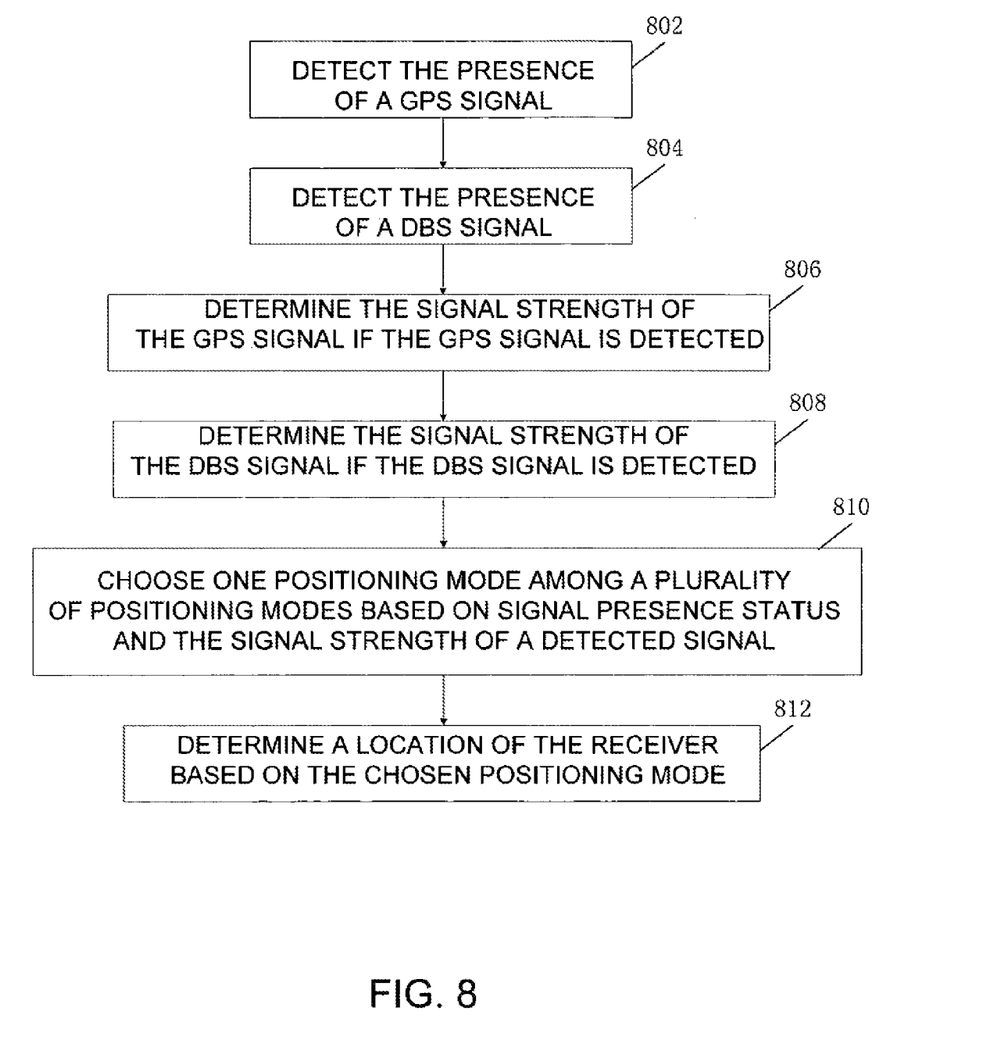
FIG. 8 is a flowchart illustrating a positioning method using GPS and DBS signal according to one embodiment of the present invention.

FIG. 8 is a flowchart illustrating a positioning method using GPS and DBS signal according to one embodiment of the present invention. A signal detector in a receiver detects the presence of the GPS signal 802 and detects the presence of the DBS signal 804. If the GPS signal is detected, the signal detector will continue to determine the signal strength, for example, the signal-to-ratio, of the GPS signal 806. If the DBS signal is detected, the signal detector will continue to determine the signal strength, for example, the signal-to-ratio, of the DBS signal 808. The receiver is capable to choose one positioning mode among a plurality of positioning modes in a signal processing unit in the receiver based on signal presence status and the signal strength of a detected signal 810. If the GPS signal is undetectable the receiver enters a standalone DBS positioning mode. If the GPS signal is invisible and an accurate positioning result is required, the receiver enters an assist DBS positioning mode. If the DBS signal is invisible, the receiver enters a standalone GPS positioning mode. If the DBS signal is invisible and a good performance of the receiver is desired, the receiver enters an assisted GPS (AGPS) positioning mode. If both the number of GPS satellites and the number of DBS transmitters are visibly limited, the receiver enters a DBS positioning with GPS assist positioning mode. If the GPS signal is weak (especially when the GPS signal is weak and the number of DBS transmitters are limited), the receiver makes use of the DBS signal and enters an assisted GPS positioning with DBS assist mode. The plurality of positioning modes are described in previously paragraphs. Based on the chosen position mode, the receiver is capable of determining the current location of the receiver 812.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A receiver for receiving wireless signals from transmitters to calculate location information, comprising:
   a first tuner for receiving a global positioning system (GPS) signal, the GPS signal having a signal strength;
   a second tuner for receiving a digital broadcasting system (DBS) signal, the DBS signal having a signal strength;
   a signal detecting unit for detecting a signal-to-noise ratio for the GPS signal and a signal-to-noise ratio for the DBS signal, the signal detecting unit outputting a signal indicating an positioning mode based on the signal-to-noise ratios of the GPS signal and the DBS signal;
   a hybrid signal processing unit in communication with the first tuner, the second tuner, and the signal detecting unit, the hybrid signal processing unit capable of operating in standalone GPS mode, standalone DBS mode, or assisted mode according to the positioning mode and determining a position of the transmitters and difference between the time the GPS signal and the DBS signal are received at the receiver; and
   a measurement data processing unit coupled to the hybrid signal processing unit for determining the location information of the receiver based on the position of the transmitters and the difference between the time the GPS signal and the DBS signal are received at the receiver.

2. The receiver of claim 1, further comprising an assist data processing unit coupled to the hybrid signal processing unit for receiving assistance data from an assist station and providing the assistance data to the hybrid signal processing unit for further signal processing when an assist positioning mode is chosen.

3. The receiver of claim 1, wherein the hybrid signal processing unit further being capable of operating a first assist positioning mode for providing time synchronization information from the DBS signal to reduce synchronization time required in an assisted GPS positioning mode, wherein the hybrid signal processing unit uses GPS signal to determine a position based on the assistance data and DBS signal.

4. The receiver of claim 1, wherein the hybrid signal processing unit further being capable of operating in an assisted GPS positioning mode, wherein the hybrid signal processing unit uses the GPS signal to determine position based on the assistance data.

5. The receiver of claim 1, wherein the hybrid signal processing unit operating in the standalone GPS mode, the hybrid signal processing unit only processes GPS signals.

6. The receiver of claim 1, wherein the hybrid signal processing unit further being capable of operating in a second assist positioning mode for providing a GPS signal to assist DBS positioning when the transmitters transmitting the DBS signal are limited and the transmitters transmitting the GPS signal are limited, wherein the hybrid signal processing unit uses both DBS signal and GPS signals to determine a position.

7. The receiver of claim 1, wherein the hybrid signal processing unit operating in the standalone DBS mode, the DBS positioning mode being chosen when the presence of GPS signals is not detected by the signal detector, wherein the hybrid signal processing unit only processes the DBS signal.

8. The receiver of claim 1, wherein the hybrid signal processing unit further being capable of operating in an assist DBS positioning mode, wherein the hybrid signal processing unit uses the DBS signals to determine position based on the assistant DBS signal.

9. A positioning method for a receiver using global positioning system (GPS) signal and digital broadcasting system (DBS) signal, wherein GPS signal having a signal strength and DBS signal also having a signal strength, comprising:

detecting presence of the GPS signal through a signal detector;

detecting presence of the DBS signal through the signal detector;

determining the signal strength of the GPS signal if the GPS signal is detected;

determining the signal strength of the DBS signal if the DBS signal is detected;

determining a ratio between the signal strength of the GPS signal and the signal strength of the DBS signal;

choosing one positioning mode among a plurality of positioning modes based on the presence of detected signals and the ratio between the signal strength of the GPS signal and the signal strength of the DBS signal; and determining a current position based on the chosen positioning mode, wherein the plurality of positioning modes comprises a first assist positioning mode for obtaining a time synchronization information from the DBS signal to reduce synchronization time required in an assisted GPS positioning mode, wherein the receiver uses the GPS signal to determine a position based on assistance data and the DBS signal, an assisted GPS positioning mode, wherein the receiver uses the GPS signal to determine a position based on assistance data from an assist server, and a standalone GPS positioning mode, wherein the receiver only receives the GPS signal.

10. The method of claim 9, wherein the plurality of positioning modes further comprising a second assist positioning mode for providing the GPS signal to assist a DBS positioning mode when the number of transmitters transmitting the DBS signal are limited and the number of transmitters transmitting the GPS signal are limited, wherein the receiver uses both DBS signal and GPS signals to determine position.

11. The method of claim 9, wherein the plurality of positioning modes further comprising a DBS positioning mode, the DBS positioning mode being chosen when the presence of the GPS signals is not detected by the signal detector, and wherein receiver only processes DBS signals.

12. The method of claim 9, wherein the plurality of positioning modes further comprising an assist DBS positioning mode, wherein the receiver uses the DBS signals to determine position based on the assistant DBS signal.

13. A receiver for receiving wireless signals from transmitters to calculate location information, comprising:

a first tuning means for receiving a global positioning system (GPS) signal, the GPS signal having a signal strength;

a second tuning means for receiving a digital broadcasting system (DBS) signal, the DBS signal having a signal strength;

means for detecting a signal-to-noise ratio for the GPS signal and a signal-to-noise ratio for the DBS signal, the means for detecting the signal-to-ratio outputting a signal indicating an positioning mode based on the signal-to-noise ratios of the GPS signal and the DBS signal;

means for processing hybrid signals in communication with the first tuning means, the second tuner, and the means for detecting the signal-to-ratio, the means for processing hybrid signals capable of operating in standalone GPS mode, standalone DBS mode, or assisted mode according to the positioning mode and determining a position of the transmitters and difference between the time the GPS signal and the DBS signal are received at the receiver; and means for processing measurement data coupled to the means for processing hybrid signals, the means for processing measurement data being capable of determining the location information of the receiver based on the position of the transmitters and the difference between the time the GPS signal and the DBS signal are received at the receiver.

14. The receiver of claim 13, further comprising an assist data processing means coupled to the means for processing hybrid signals for receiving assistance data from an assist station and providing the assistance data to the hybrid signal processing unit for further signal processing when an assist positioning mode is chosen.

15. The receiver of claim 13, wherein the means for processing hybrid signals further being capable of operating a first assist positioning mode for providing time synchronization information from the DBS signal to reduce synchronization time required in an assisted GPS positioning mode, wherein the means for processing hybrid signals uses GPS signal to determine a position based on the assistance data and DBS signal.

16. The receiver of claim 13, wherein the means for processing hybrid signals further being capable of operating in an assisted GPS positioning mode, wherein the means for processing hybrid signals uses the GPS signal to determine position based on the assistance data.

17. The receiver of claim 13, wherein the means for processing hybrid signals operating in the standalone GPS mode, the means for processing hybrid signals only processes GPS signals.

18. The receiver of claim 13, wherein the means for processing hybrid signals further being capable of operating in a second assist positioning mode for providing a GPS signal to assist DBS positioning when the transmitters transmitting the DBS signal are limited and the transmitters transmitting the GPS signal are limited, wherein the means for processing hybrid signals uses both DBS signal and GPS signals to determine a position.

19. The receiver of claim 13, wherein the means for processing hybrid signals operating in the standalone DBS mode, the DBS positioning mode being chosen when the presence of GPS signals is not detected by the signal detector, wherein the means for processing hybrid signals only processes the DBS signal.

20. The receiver of claim 13, wherein the means for processing hybrid signals further being capable of operating in an assist DBS positioning mode, wherein the means for processing hybrid signals uses the DBS signals to determine position based on the assistant DBS signal.

* * * * *

UNITED STATES PATENT AND TRADEMARK OFFICE
CERTIFICATE OF CORRECTION

PATENT NO. : 8,004,460 B2
APPLICATION NO. : 12/726887
DATED : August 23, 2011
INVENTOR(S) : You-Yuh Jack Shyr, Mingqiang Cheng and Cuichai Ji It is certified that error appears in the above-identified patent and that said Letters Patent is hereby corrected as shown below:

Title Page, Item (75)
For the inventors' addresses, correct the city for Mingqiang Cheng and Cuichai Ji from "Shengdu" to "Chengdu".

Signed and Sealed this
Eighteenth Day of October, 2011

David J. Kappos
*Director of the United States Patent and Trademark Office*